US012645444B2

(12) United States Patent
Bouat et al.

(10) Patent No.: US 12,645,444 B2
(45) Date of Patent: Jun. 2, 2026

(54) UNIFIED VIRTUALIZED AND CONTAINERIZED CI/CD CHAIN

(71) Applicant: HEWLETT PACKARD ENTERPRISE DEVELOPMENT LP, Spring, TX (US)

(72) Inventors: Sebastien Bouat, Grenoble (FR); Valentin D. Emmanuele, Grenoble (FR); Maxim Patrushev, Grenoble (FR)

(73) Assignee: Hewlett Packard Enterprise Development LP, Spring, TX (US)

( * ) Notice: Subject to any disclaimer, the term of this patent is extended or adjusted under 35 U.S.C. 154(b) by 187 days.

(21) Appl. No.: 18/345,433

(22) Filed: Jun. 30, 2023

(65) Prior Publication Data

US 2024/0345823 A1     Oct. 17, 2024

(30) Foreign Application Priority Data

Apr. 14, 2023     (EP) ..................................... 23305577

(51) Int. Cl.
      *G06F 9/44*          (2018.01)
      *G06F 8/65*          (2018.01)
(52) U.S. Cl.
      CPC ..................................... G06F 8/65 (2013.01)
(58) Field of Classification Search
      CPC ....................................................... G06F 8/65
      USPC ......................................................... 717/168
      See application file for complete search history.

(56) References Cited

U.S. PATENT DOCUMENTS

| | | | | |
|---|---|---|---|---|
| 10,929,117 | B2 * | 2/2021 | Goldmann | .......... G06F 9/45558 |
| 11,755,369 | B2 * | 9/2023 | Doudali | ................ G06F 9/5005 |
| | | | | 718/1 |
| 11,790,101 | B2 * | 10/2023 | Hall | .......................... G06F 8/60 |
| | | | | 726/28 |
| 2012/0117531 | A1 * | 5/2012 | Rosenbaum | ............ G06F 9/445 |
| | | | | 717/100 |

(Continued)

FOREIGN PATENT DOCUMENTS

WO          2021/245447  A1     12/2021

OTHER PUBLICATIONS

AWS Startup Collection, "Using Containers to Build a Microservices Architecture", available online at <https://medium.com/aws-activate-startup-blog/using-containers-to-build-a-microservices-architecture-6e1b8bacb7d1>, Jan. 20, 2015, 20 pages.

(Continued)

*Primary Examiner* — Evral E Bodden
(74) *Attorney, Agent, or Firm* — Hewlett Packard Enterprise Patent Department

(57)          ABSTRACT

Examples of the present technology provide automated Continuous Integration/Continuous Deployment (CI/CD) systems that unify the CI/CD methodology for virtualized and containerized software environments. To realize this unification, CI/CD systems of the present technology are intelligently designed to leverage a common set of inputs (i.e., artifacts and deployment descriptors) that can facilitate automatic deployment of the software system in either a virtualized environment, a containerized environment, or both. Accordingly, CI/CD systems of the present technology provide a flexible software development tool that facilitates efficient, and automated deployment of software systems in both virtualized and containerized environments.

20 Claims, 5 Drawing Sheets

(56)                    References Cited

U.S. PATENT DOCUMENTS

2016/0350081  A1*  12/2016  Kumar ..................... G06F 8/30
2020/0228402  A1    7/2020  Parker
2022/0035650  A1    2/2022  Banerjee et al.
2022/0147378  A1*  5/2022  Tarasov ................ G06F 16/196
2022/0201447  A1    6/2022  Asawa et al.
2024/0078172  A1*  3/2024  Duggal .............. G06F 11/3696

OTHER PUBLICATIONS

Cloud Architecture Center, "Best practices for operating contain-
ers", available online at <https://cloud.google.com/architecture/best-
practices-for-operating-containers#immutability>, Feb. 28, 2023,
16 pages.
NGMN Alliance, "Service-Based Architecture in 5G Case Study
and Deployment Recommendations", 2019, 24 pages.

* cited by examiner

Figure 4:
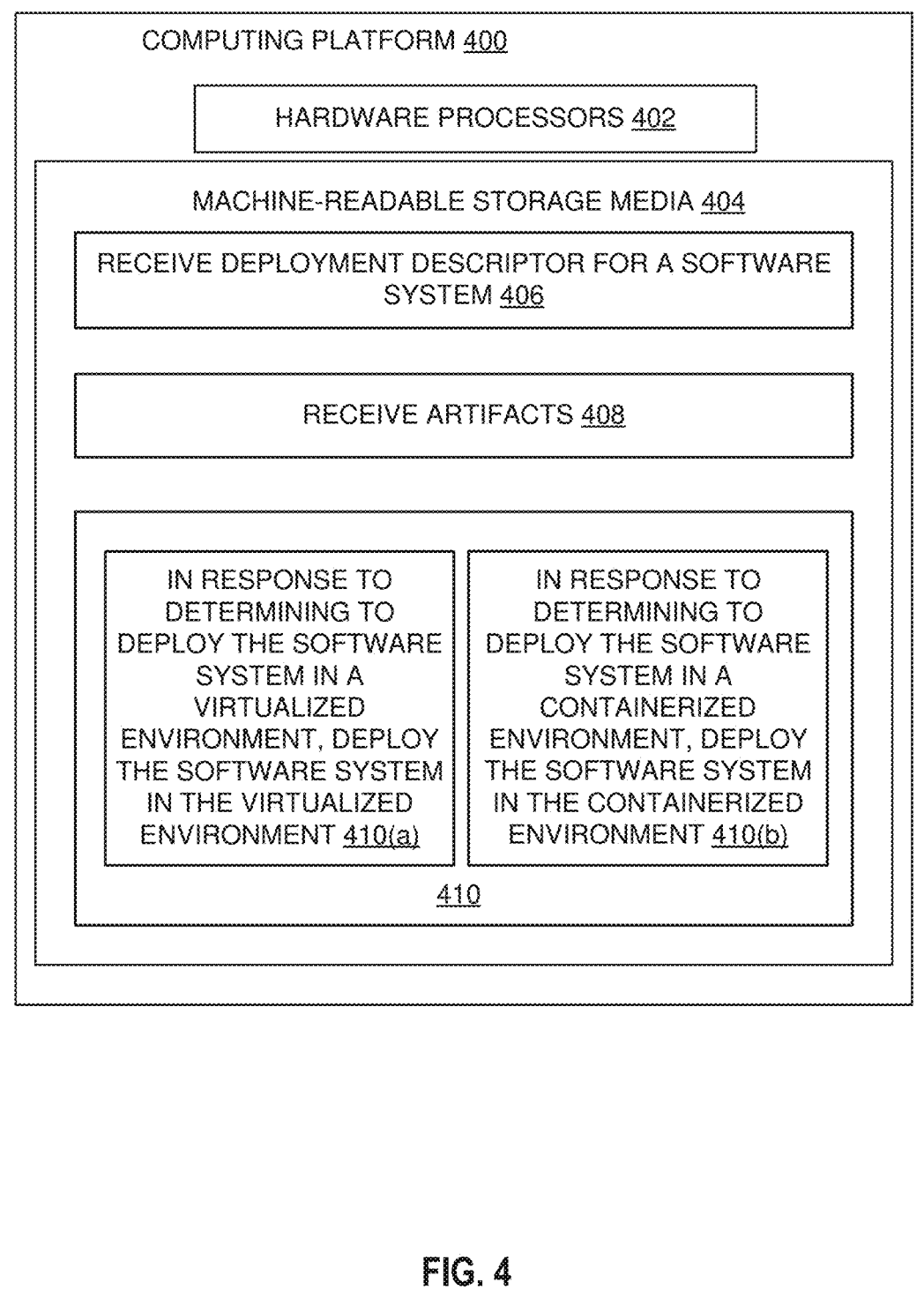

COMPUTING PLATFORM 400

HARDWARE PROCESSORS 402

MACHINE-READABLE STORAGE MEDIA 404

RECEIVE DEPLOYMENT DESCRIPTOR FOR A SOFTWARE SYSTEM 406

RECEIVE ARTIFACTS 408

IN RESPONSE TO DETERMINING TO DEPLOY THE SOFTWARE SYSTEM IN A VIRTUALIZED ENVIRONMENT, DEPLOY THE SOFTWARE SYSTEM IN THE VIRTUALIZED ENVIRONMENT 410(a)

IN RESPONSE TO DETERMINING TO DEPLOY THE SOFTWARE SYSTEM IN A CONTAINERIZED ENVIRONMENT, DEPLOY THE SOFTWARE SYSTEM IN THE CONTAINERIZED ENVIRONMENT 410(b)

UNIFIED VIRTUALIZED AND CONTAINERIZED CI/CD CHAIN

BACKGROUND

Continuous Integration/Continuous Deployment (CI/CD) is a software development methodology that involves iterative/continuous integration, testing, and deployment of code for a software system. For example, during a Continuous Integration (CI) stage (sometimes referred to as a CI chain), members of a software development team can publish source code of a software system they are working on to a shared code repository on a frequent (e.g., daily) basis. A CI/CD system (e.g., one or more software programs, APIs, etc.) can automatically integrate/build the code published to the code repository and test it in a rapid manner—thereby identifying (and in some cases, remedying) bugs and other issues early and often. In a Continuous Deployment (CD) stage (sometimes referred to as a CD chain), the CI/CD system can automatically deploy tested/validated code of the software system in a software environment (e.g., a virtualized or containerized software environment)—thereby making the software system (and any associated updates to the software system) available to end users in a rapid manner. The CI/CD can also run functional tests that ensure an end-to-end version of the software system runs properly. In some cases, instead of, or in addition to the Continuous Deployment stage, the CI/CD methodology may include a Continuous Delivery (i.e., another version of the "CD") stage where the CI/CD system automatically deploys tested/validated code of the software system in production-like software environments for further testing/quality assurance before (often human-approved) release to end users.

Computerized CI/CD systems (sometimes referred to herein as CI/CD systems, or CI/CD chains) can significantly reduce the time required to develop, update, and deploy software systems. These advantages can be associated with a CI/CD system's ability to rapidly integrate and test source code, and rapidly/seamlessly deploy tested/validated source code in new or updated software systems. This can improve functioning of the software systems themselves, and the computing devices on which the software systems are run.

BRIEF DESCRIPTION OF THE DRAWINGS

The present disclosure, in accordance with one or more various examples, is described in detail with reference to the following figures. The figures are provided for purposes of illustration only and merely depict examples.

FIG. 4 illustrates an example computing component that may be used to deploy a software system in a virtualized software environment, a containerized software environment, or both, in accordance with various examples of the present technology.

Figure 1:
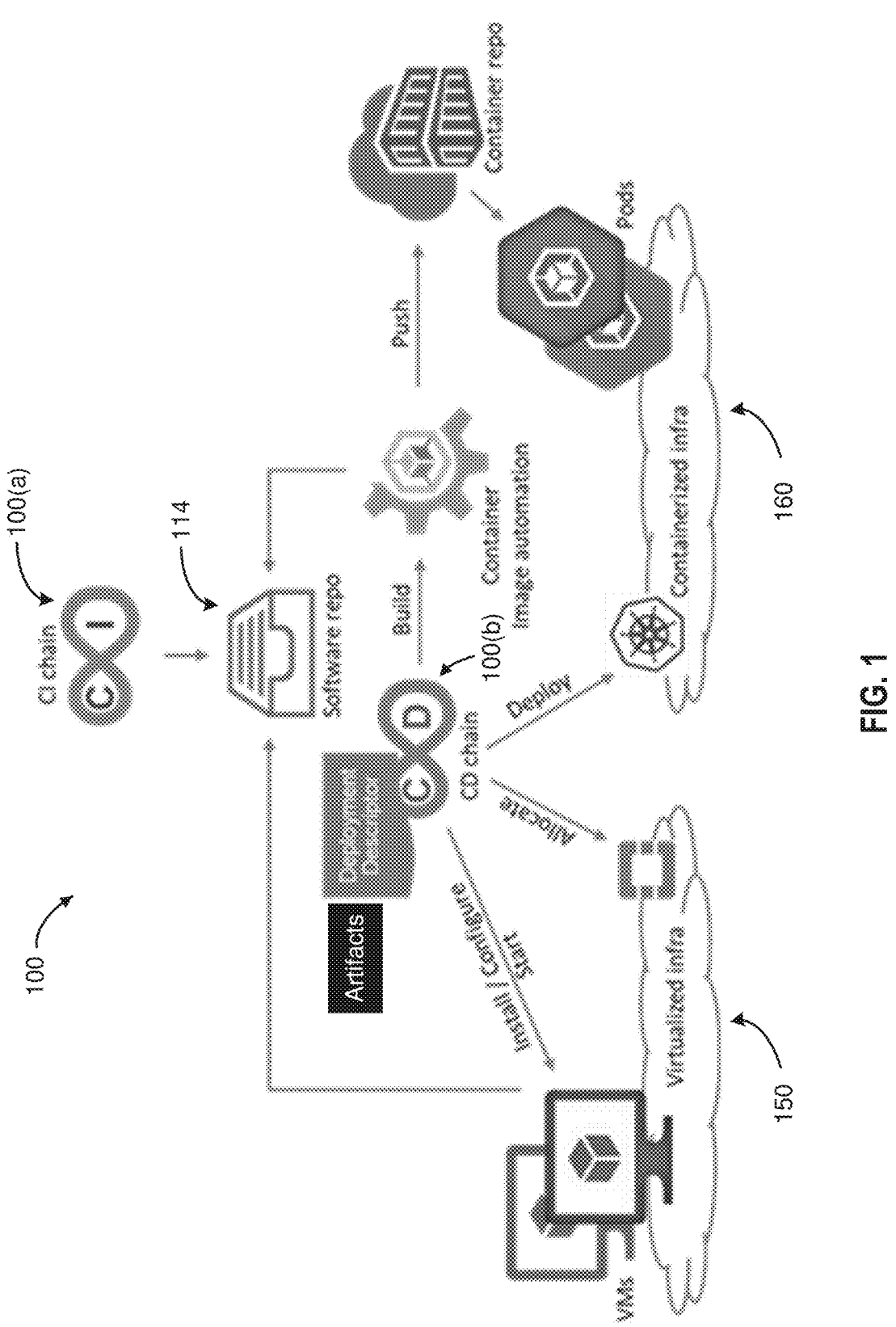
FIG. 1 depicts an example CI/CD system 100, in accordance with various examples of the present technology.

The figures are not exhaustive and do not limit the present disclosure to the precise form disclosed.

DETAILED DESCRIPTION

The Telecom industry generally follows Information Technology (IT) trends. A recent trend in the IT industry has been a migration from virtualized software infrastructure to containerized software infrastructure (sometimes referred to as Cloud Native infrastructure). It is likely that the Telecom industry will follow suit. For example, containerization is foreseeable for the 5G standard based in part on 5G's service-based architecture.

However, a migration from virtualized software infrastructure to containerized software infrastructure presents significant challenges for the Telecom industry (and other industries) due in part to the sheer amount of legacy software/equipment that was not designed to run containerized workloads. For example, while Communication Service Providers (CSPs) promote 5G to the consumer market, many of their networks include a large amount of equipment (and associated software) designed to support previous generations. Often, this legacy equipment/software leverages virtualized software environments.

Legacy Telecom equipment/software (typically dated from the "Application Server era," with associated massive monolithic software bundling many functionalities) is not likely to be replaced because of associated risk and a limited benefit vs. cost ratio for CSPs. However, assuming the Telecom industry migrates to containerized infrastructure as expected—such legacy Telecom equipment/software will likely migrate to containerization in order to operate with new equipment/software designed around containerization from day one. Aside from potential performance/reliability issues associated with utilizing containerization for legacy Telecom equipment/software not designed to support such functionality—such a scenario can also impose constraints on the software deployment process. For example, designing software systems that can be containerized on the application servers of legacy Telecom equipment presents unique challenges. For example (and as alluded to above), such legacy Telecon equipment/software may be associated with massive monolithic software bundling many functionalities. Each functionality may be a self-contained component having its own life cycle—which can make the process of constructing containerized workloads (e.g., generation of container images) exceedingly complex. These challenges are amplified by differences across legacy Telecom equipment/software of different vendors, suppliers, etc.

For at least the reasons stated above, a migration from virtualized software infrastructure to containerized software infrastructure for the Telecom industry is expected to be a challenging, lengthy process. Accordingly, virtualized software infrastructure and containerized software infrastructure are likely to co-exist within the Telecom industry (and potentially other industries) during a transitionary period between the two technologies. For this reason, there is a need for flexible/adaptable computerized software development tools that facilitate efficient deployment for software systems in both virtualized and containerized environments.

As alluded to above, computerized CI/CD systems (sometimes referred to as CI/CD systems, or CI/CD chains) can significantly reduce the time required to develop, update, and deploy software systems.

However, existing CI/CD systems are ill-equipped to support an industry migration from virtualized software infrastructure to containerized software infrastructure. In part, this is because existing CI/CD systems tend to focus on a single technology: i.e., either virtualization or containerization. That is, existing CI/CD systems generally only facilitate natively containerized software solutions or purely virtualized software solutions—with few attempts to bridge the gap between the two. This can present a problem during a lengthy/iterative industry migration where virtualized and containerized infrastructure are expected to co-exist. Again, this problem can be associated with needing separate existing CI/CD systems to deploy a software system in both a virtualized and a containerized environment.

A related shortcoming of existing CI/CD systems that focus on containerized software solutions is that they generally assume container images (i.e., major building blocks of containerized software deployments) are built upstream. That is, these existing containerized software solution-focused CI/CD systems generally take container images as inputs. This can lead to inefficiencies (e.g., increased human labor, increased development costs, need for additional software tools/systems, etc.) in scenarios where a user (or team of users) wants to deploy a common software system in both a containerized and virtualized environment. For example, the extra upstream work required for generating container images does not advance/progress deployment in the virtualized environment. Relatedly, the upstream work required for generating the container images does not benefit from the automation advantages provided by the existing CI/CD systems. Moreover (and as alluded to above), generating container images can be especially complex for implementations involving legacy equipment/software (e.g., legacy Telecom equipment/software from the "Application Server era") that was not designed from the ground up around containerization.

Against this backdrop, examples of the present technology provide computerized CI/CD systems that unify the CI/CD methodology for virtualized and containerized software environments. To realize this unification, CI/CD systems of the present technology are intelligently designed to leverage a common set of inputs (i.e., deployment descriptors and artifacts—to be described in greater detail below) that can facilitate automatic deployment of the software system in either a virtualized environment, a containerized environment, or both. Accordingly, CI/CD systems of the present technology provide a flexible, computerized software development tool that facilitates efficient, and automated deployment of software systems in both virtualized and containerized environments. Relatedly, and as will be described in greater detail below, CI/CD systems of the present technology also facilitate (and in some cases perform) automated generation of container images. Accordingly, CI/CD systems of the present technology can reduce inefficiencies associated with generating container images upstream from the CI/CD process—thereby improving efficiency for containerized software deployment. As alluded to above, by: (1) providing an improved computerized software development tool that facilitates efficient, and automated deployment of software systems in both virtualized and containerized environments; and (2) improving efficiency for containerized software deployment—CI/CD systems of the present technology may be better-equipped than existing CI/CD systems to support industry migrations from virtualized to containerized environments. This may include the expected/imminent migration for the Telecom industry. Relatedly, by providing an improved computerized CI/CD system, examples can improve functioning of software systems, and the computing devices on which the software systems are run. For example, CI/CD systems of the present technology can improve the functioning of Legacy telecom equipment by facilitating improved operation of the Legacy telecom equipment when running containerized workloads.

To achieve a unified virtualization/containerization solution, a CI/CD system of the present technology can leverage a versatile "deployment descriptor" that describes: (1) an inventory of instantiated components (i.e., instances of software components such as databases, application servers, services to be deployed in an application server, etc.) to be deployed in a software system; (2) relationships between the instantiated components within the software system; and (3) configuration parameters for the instantiated components. In some examples, the deployment descriptor for the software system may be provided to the CI/CD system by a user (or team of users) in the form of Layout and Settings files.

In various examples, the CI/CD system can also leverage "artifacts" that describe components being instantiated as the instantiated components (as used herein an artifact may refer to data or information, such as a computer file, that describes components being instantiated as the instantiated components). For example, an artifact may comprise a "component specification" file describing various aspects of a component in a formal language (e.g., a JSON-based language) such as the component's relationship with other components, potential configuration parameters for the component, etc. The artifact may also describe software packages (e.g., generated by a CI chain of the CI/CD system) supporting the component and deployment routines that allow the CI/CD system to perform various operations on instances of the component (e.g., configuration, installation, start-up, etc.). Artifacts may be "on-boarded" to a catalog of the CI/CD system by users in an iterative manner, or in conjunction with uploading the deployment descriptor. The deployment descriptor may refer back to on-boarded components when describing the instantiated components to be deployed in the software system.

As alluded to above, an advantage of the CI/CD system of the present technology is that the above-described inputs (i.e., deployment descriptors and artifacts) are leveraged for deploying the software system in a virtualized environment, a containerized environment, or both. This promotes improved efficiency (e.g., reduced human labor, reduced development costs, reduced need for additional software tools/systems, etc.) in scenarios where a user (or team of users) wants to deploy a common software system in both a containerized and virtualized environment. This is because—aside from typical inputs provided to the CI chain of the CI/CD system—the user (or team of users) may simply provide the above-described deployment descriptor and artifacts to a CI/CD system of the present technology. With these versatile inputs, the CI/CD system can then automatically deploy the software system in a virtualized environment, a containerized environment, or both For example, in response to determining to deploy the software system in a containerized environment, the CI/CD system can: (1) use the artifacts and the deployment descriptor to compute containerization workflows for building container images for the software system; (2) provide the containerization workflows to a container image automation service that builds container images for the software system based on the containerization workflows; and (3) deploy the software system in the containerized environment using the built container images. In some examples, the CI/CD system may also determine containerization configuration parameters (i.e., configuration parameters for building container images) for building the container images for the software system and provide the determined containerization configuration parameters to the container image automation service. In various examples the container image automation service can be implemented as part of the CI/CD system—although in other examples the container image automation service can be an external service in communication with the CI/CD system. In certain examples, the container image automation service may publish the built container images to a container repository. In these examples, the containerized environment may pull the built container images from the container repository to run the software system in the containerized environment.

In contrast to the paragraph above, in response to determining to deploy the software system in a virtualized environment, the CI/CD system can (1) use the artifacts and the deployment descriptor to determine virtual computing resources for deploying the software system in the virtualized environment; and (2) in response to allocation of the determined virtual computing resources, compute and execute a virtualization workflow for deploying the software system in the virtualized environment using the allocated virtual computing resources. In certain examples, the CI/CD system may request the determined virtual computing resources from a virtual computing resource manager. In certain examples the virtual computing resource manager may be implemented as part of the CI/CD system—while in other examples the virtual computing resource manager may be an external service/manager in communication with the CI/CD system.

As will be described below, the CI/CD system can leverage various deployment technologies when deploying the software system in the containerized and virtual environments. As non-limiting examples, the CI/CD system may use Ansible®, Chef™, Salt™, etc.

Examples of the present technology will be described in greater detail on conjunction with the following FIGS.

FIG. 1 depicts an example CI/CD system 100, in accordance with various examples of the present technology. As depicted, CI/CD system 100 comprises a CI chain 100(*a*) and a CD chain 100(*b*).

In some examples, CI chain 100(*a*) can automatically build, integrate, and package source code published to CI/CD system 100 into components of a software system (examples of components may include databases, application servers, services to be deployed in an application server, etc.). As a simple example, source code for a component may be written and published in Java while a target operating system is RedHat Linux. CI chain 100(*a*) can compile the Java source code, put binaries in a JAR file, and package the JAR file into a RedHat Package Manager (RPM) package that can be used to deliver/deploy the component on RedHat Linux. As will be described in greater detail below, an artifact associated with the component can reference this RPM package when describing the component. The artifact can also describe/define methods for deploying the component/RPM package.

As alluded to above, one or more software developers (e.g., of a software development team) working on the software system can publish the source code to CI/CD system 100 on a frequent/continuous basis (e.g., daily). CI chain 100(*a*) can then automatically (and rapidly) build/integrate/package the published source code on a similarly frequent/continuous basis.

Once built/integrated/packaged, CI chain 100(*a*) can test the components in a rapid manner—thereby identifying (and in some cases, remedying) bugs and other issues early and often. As depicted, in certain examples tested/validated components of the software system can be stored in software repository 114.

CD chain 100(*b*) can instantiate components of the software system tested/validated by CI chain 100(*a*), and automatically deploy the instantiated components (i.e., instantiated components) in a virtualized software environment 150, a containerized software environment 160, or both.

As alluded to above, conventional computerized CI/CD systems tend to focus on a single technology: i.e., either virtualization or containerization. That is, existing CI/CD systems generally only facilitate natively containerized software solutions or purely virtualized software solutions—with few attempts to bridge the gap between the two. This can present a problem during migrations from virtualized to containerized software infrastructure where virtualized and containerized software infrastructure are expected to co-exist. Again, this problem may be associated with using separate existing CI/CD systems to deploy a software system in both a virtualized and a containerized environment.

To address this problem, examples of the present technology provide computerized CI/CD systems (e.g., CI/CD system 100) that unify the CI/CD methodology for virtualized and containerized software environments. To achieve this unified virtualization/containerization solution, CI/CD system 100 leverages a versatile "deployment descriptor" and descriptive "artifacts"—which can be received as inputs to CD chain 100(*b*).

The deployment descriptor may describe: (1) an inventory of instantiated components to be deployed in the software system; (2) relationships between the instantiated components within the software system; and (3) configuration parameters for the instantiated components. In some examples, the deployment descriptor for the software system may be provided to CI/CD system 100 by a user (or team of users) in the form of Layout and Settings files.

A Layout file can define instantiation of components and describe how the instantiated components connect to each other. For instance, if the software system includes a front-end web service and a back-end database, the front-end web service may be modeled by a first component and the back-end database may be modeled by a second component. The front-end web service component may contain information that explains the front-end web service component requires the back-end database component. Accordingly, a first Layout file may explain that an instance of the front-end web service component should be connected to an instance of the back-end database component. If this simple Layout is insufficient to handle all the traffic of the front-end web service, a second Layout file may explain that three instances of the front-end web service component are required, all of which should be connected to the instance of the back-end database component.

A Settings file can define the configuration parameters for each instantiated component. As a simplified example to illustrate the concept, the instantiated front-end web service component from above may need to be configured with an a hypertext Transfer Protocol (HTTP) port. Relatedly, the instantiated back-end database component from above may need to be configured with a requisite amount of memory and disk. These parameters may first be defined in respective artifacts associated with the respective components (as described below). A Settings file for the first Layout described above (i.e., one instantiated front-end web service component and one instantiated back-end database component) may then hold the values of the HTTP port of the instantiated front-end web service component, and the requisite amount of memory and disk for the instantiated back-end database component. A Settings file for the second Layout described above (i.e., three instantiated front-end web service components and one instantiated back-end database component) may hold the three HTTP ports for the three instantiated front-end web service components, and the requisite amount of memory and disk for the instantiated back-end database component.

As depicted, CI/CD system 100 can also leverage "artifacts" that describe the components being instantiated as the instantiated components. As used herein, an artifact may refer to data or information, such as a computer file, that describes components being instantiated as the instantiated components. As alluded to above, the components described by the artifacts may be the components of the software system generated and tested/validated by CI chain 100(*a*). In various examples, an artifact may comprise a "component specification" file describing various aspects of a component in a formal language (e.g., a JSON-based language) such as the component's relationship with other components, potential configuration parameters for the component, etc. The artifact may also describe software packages generated by CI chain 100(*a*) supporting the component (e.g., an RPM package) and deployment routines that allow CI/CD system 100 to perform various operations on the instantiated components (e.g., configuration, installation, start-up, etc.). Artifacts may be "on-boarded" to a catalog of CI/CD system 100 by users in an iterative manner, or in conjunction with uploading the deployment descriptor. As alluded to above, the deployment descriptor may refer back to on-boarded components when describing the instantiated components to be deployed in the software system.

An advantage provided by CI/CD system 100 is that the above-described inputs (i.e., the deployment descriptor and artifacts) can be leveraged for deploying the software system in virtualized software environment 150, containerized software environment 160, or both. This promotes improved efficiency (e.g., reduced human labor, reduced development costs, reduced need for additional software tools/systems, etc.) in scenarios where user (or team of users) wants to deploy the software system in both a containerized and virtualized environment. This is because users may simply provide: (1) source code that CI chain 100(*a*) builds/integrates/packages into components for the software system—which is a common/typical input for computerized CI/CD systems; and (2) the above-described deployment descriptor and artifacts. With these versatile inputs, CI/CD system 100 can then automatically deploy the software system in virtualized software environment 150, containerized software environment 160, or both.

Specific methodologies for deploying the software system in virtualized software environment 150 and containerized software environment 160 will be described in greater detail in conjunction with FIGS. 2 and 3 respectively.

Figure 2:
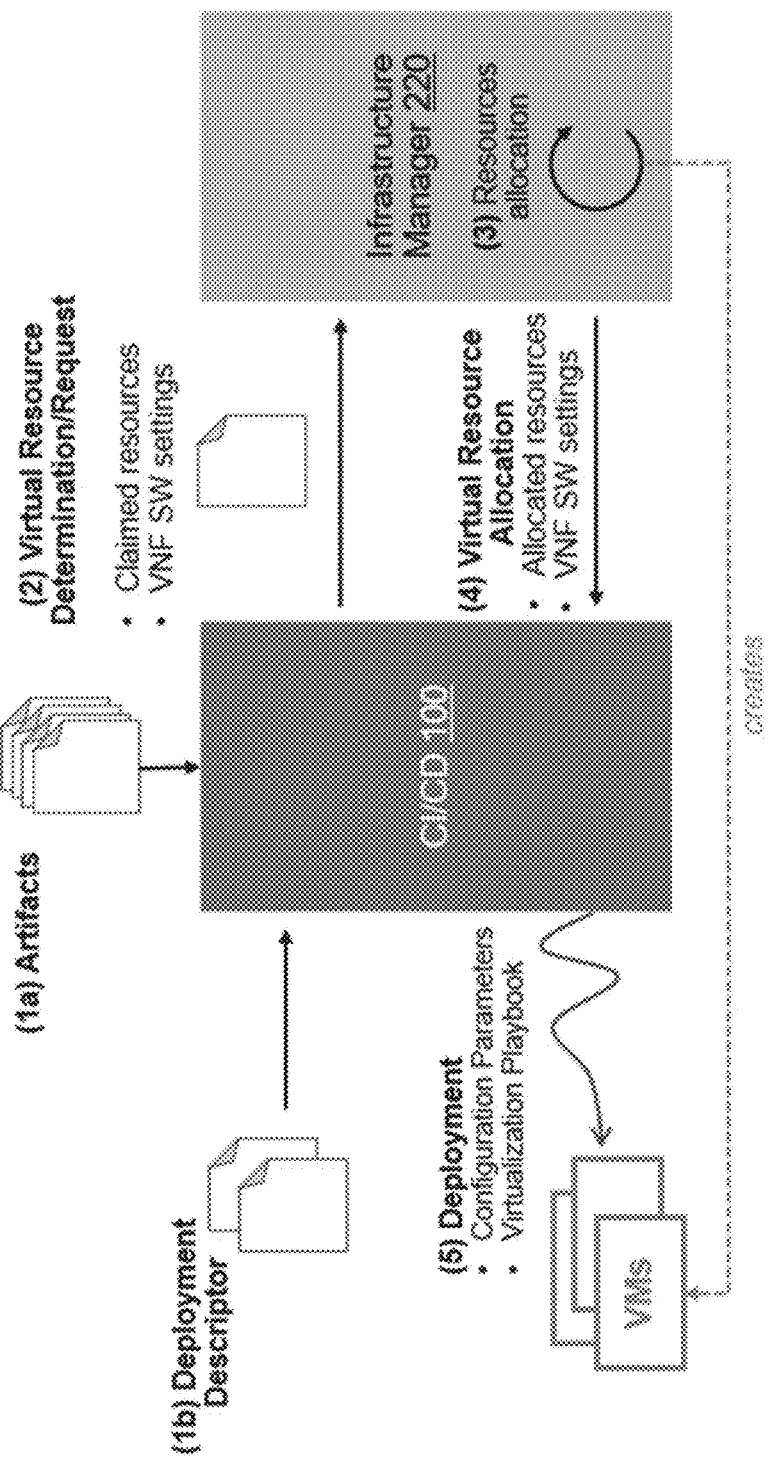
FIG. 2 depicts an example flow diagram that may be used to implement automatic deployment of a software system in a virtualized environment, in accordance with various examples of the present technology.

FIG. 2 depicts an example flow diagram that may be used to implement automatic deployment of a software system in a virtualized environment, in accordance with various examples of the present technology. As depicted, CI/CD system 100 of FIG. 1 may be used to implement such automatic deployment. Before describing the flow diagram in more detail, it should be understood that in various examples the disclosed steps may be performed in different orders.

At steps 1*a* and 1*b*, CI/CD system 100 can receive a deployment descriptor and artifacts associated with the software system.

As alluded to above, the deployment descriptor may describe: (1) an inventory of instantiated components to be deployed in the software system; (2) relationships between the instantiated components within the software system; and (3) configuration parameters for the instantiated components. In some examples, the deployment descriptor for the software system may be provided to CI/CD system 100 (e.g., by a user or team of users) in the form of Layout and Settings files.

As alluded to above, the "artifacts" may describe the components being instantiated as the instantiated components. As alluded to above, such components may be components of the software system generated and tested/validated by a CI chain of CI/CD system 100 (e.g., CI chain 100(*a*)). In various examples, an artifact may comprise a "component specification" file describing various aspects of a component in a formal language (e.g., a JSON-based language) such as the component's relationship with other components, potential configuration parameters for the component, etc. The artifact may also describe software packages generated by the CI chain of CI/CD system supporting the component (e.g., an RPM package) and deployment routines that allow CI/CD system 100 to perform various operations on the instantiated components (e.g., configuration, installation, start-up, etc.). Artifacts may be "on-boarded" to a catalog of CI/CD system 100 by users in an iterative manner, or in conjunction with uploading the deployment descriptor. The deployment descriptor may refer back to on-boarded components when describing the instantiated components to be deployed in the software system.

At step 2, CI/CD system 100 can use the deployment descriptor and artifacts to determine virtual computing resources (e.g., virtual machines) for deploying/hosting the software system in a virtualized environment. In some examples, after determining the virtual computing resources for deploying/hosting the software system in the virtualized environment, CI/CD system can request the virtual computing resources from a virtual computing resource manager 220. In certain examples, the virtual computing resource manager 220 may be implemented as part of CI/CD system 100. In other examples, virtual computing resource manager 220 may be implemented separately from, but in communicative connection with, CI/CD system 100. In some examples, CI/CD system 100 may include Virtual Network Function (VNF) software (SW) settings with a request for determined virtual computing resources. Here it should be understood that steps 1 and 2 may occur several days or weeks before deployment of the software system which starts at step 3. It can be a challenge for CI/CD system 100 to hold contextual information related to the software system for this time duration. Accordingly, the VNF SW settings can hold this contextual information related to the software system. The VNF SW settings may be generated at step 2 by CI/CD system 100. CI/CD system 100 may later consume the VNF SW settings/contextual information at step 4.

At step 3, the virtual computing resources for deploying/hosting the software system in the virtualized environment are allocated. As alluded to above, these virtual computing resources may be allocated by virtual computing resource manager 220. Allocating the virtual computing resources may include creating/generating virtual machines. Names, IP addresses, and network connections for the virtual machines may be generated by virtual computing resource manager 220 at step 3.

At step 4, the allocated virtual computing resources may be triggered back to CI/CD system 100. In this way, CI/CD system 100 obtains information related to the allocated virtual computing resources (e.g., what networks the allocated virtual computing resources/virtual machines are connected to, names of the allocated virtual computing resources/virtual machines, IP addresses of the allocated virtual computing resources/virtual machines, etc.) In some examples, VNF SW settings may be included with the allocated virtual computing resources. As alluded to above, the VNF SW settings may hold contextual information related to the software system that can be used/consumed by CI/CD system 100 to assist with performance of step 4.

At step 5, using the deployment descriptor and artifacts, CI/CD system 100 computes and executes a virtualization workflow (e.g., an Ansible virtualization playbook) for deploying the software system in the virtualized environment using the allocated virtual computing resources. The virtualization workflow may define a set of instructions for instantiating components, and deploying instantiated components for the software system within the virtualized environment. For example, the virtualization workflow may detail an appropriate sequence of deployment routines to be run for instantiating appropriate components on appropriate virtual machines.

In various examples, CI/CD system 100 can also use the deployment descriptor and artifacts to determine virtualization configuration parameters (i.e., configuration parameters for deploying instantiated components using virtual machines) for deploying the software system in the virtualized environment using the allocated virtual computing resources. CI/CD system 100 can use the determined virtualization configuration parameters (in addition to the virtualization workflow) for instantiating components, and deploying instantiated components for the software system within the virtualized environment.

In some examples, CI/CD system 100 can natively integrate with various virtualized infrastructure types such as OpenStack, VMWare, European Telecommunications Standards Institute (ETSI) NFV, Amazon Web Services, etc. Relatedly, various deployment technologies may be leveraged to deploy the software system in the virtualized software environment (e.g., Ansible®, Chef™, Salt™, etc.).

Figure 3:
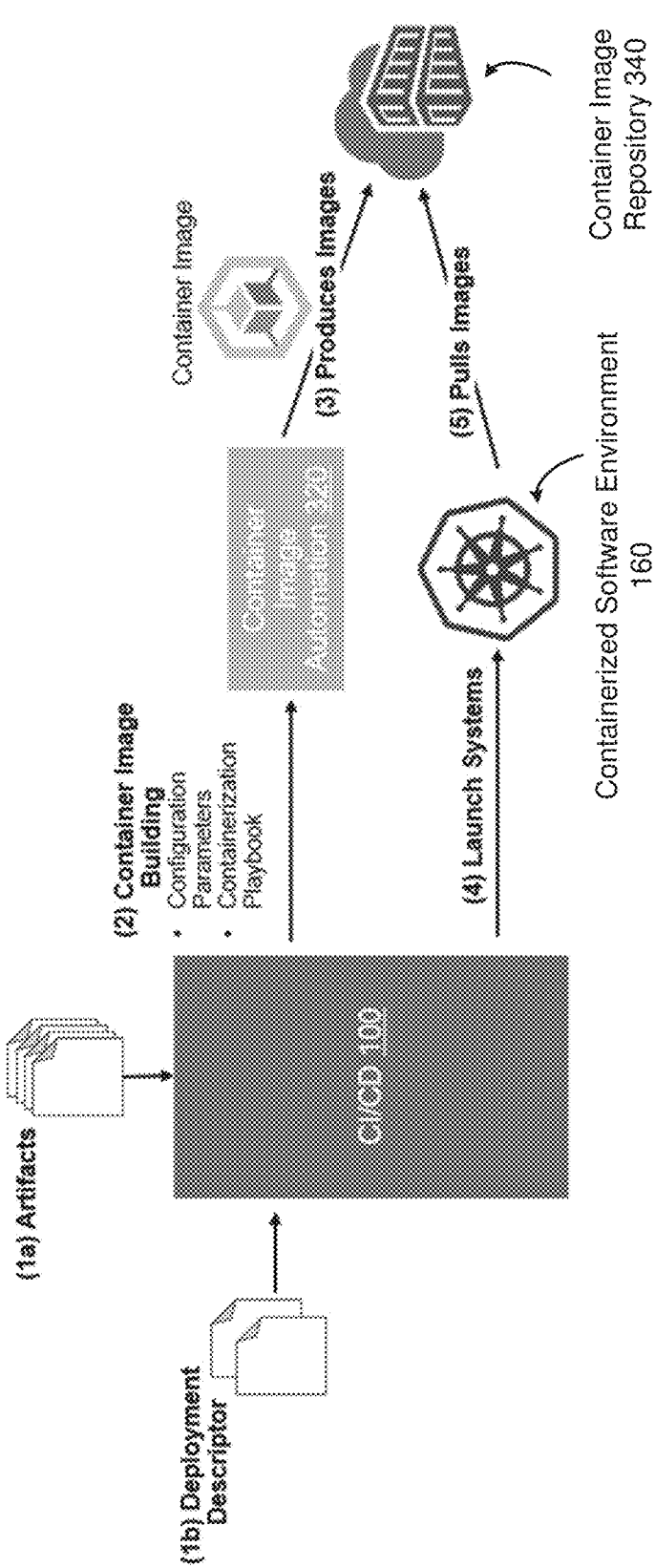
FIG. 3 depicts an example flow diagram that may be used to implement automatic deployment of a software system in a containerized environment, in accordance with various examples of the present technology.

FIG. 3 depicts an example flow diagram that may be used to implement automatic deployment of a software system in a containerized environment, in accordance with various examples of the present technology. CI/CD system 100 of FIG. 1 may be used to implement such automatic deployment. Before describing the flow diagram in more detail, it should be understood that in various examples the disclosed steps may be performed in different orders.

At steps 1a and 1b, CI/CD system 100 can receive the same deployment descriptor and artifacts associated with the software system as described in conjunction with FIG. 2 for automatic deployment of the software system in the virtualized environment.

As alluded to above, an advantage provided by CI/CD system 100 is that the above-described inputs (i.e., the deployment descriptor and artifacts) can be leveraged for deploying the software system in a virtualized software environment, a containerized software environment (e.g., containerized software environment 160), or both. This promotes improved efficiency (e.g., reduced human labor, reduced development costs, reduced need for additional software tools/systems, etc.) in scenarios where a user (or team of users) wants to deploy the software system in both a containerized and virtualized environment. This is because the user (or team of users) may simply provide: (1) source code published to CI/CD system 100 which CI/CD system 100 uses to build/integrate/package components of the software system; and (2) the above-described deployment descriptor and artifacts. With these versatile inputs, CI/CD system 100 can then automatically deploy the software system in a virtualized software environment, containerized software environment 160, or both.

At step 2, CI/CD system 100 can use the artifacts and the deployment descriptor to compute a set of containerization workflows (e.g., a set of Ansible containerization playbooks) for building container images for the software system. Here, each containerization workflow may be used to build a separate container image. Relatedly, each containerization workflow/container image may correspond to a separate workload in the containerized environment. Accordingly, a containerization workflow may define a set of instructions for instantiating components of a specific workload of the software system, and deploying the instantiated components of the specific workload within containerized environment 160. For example, a containerization workflow can detail installation deployment routines for construction of a container image, configuration and startup routines for bootstrapping instantiated components within the container image, etc.

In certain examples, CI/CD system 100 may also use the artifacts and the deployment descriptor to determine containerization configuration parameters (e.g., Ansible inventory) for building the container images for the software system.

In various examples, CI/CD system 100 can provide the containerization workflows and containerization configuration parameters to a container image automation service 320. In certain examples, container image automation service 320 may be implemented as part of CI/CD system 100. In other examples, container image automation service 320 may be implemented separately from, but in communicative connection with, CI/CD system 100.

At step 3, container image automation service 320 builds container images for the software system based on the containerization workflows and the containerization configuration parameters. As depicted, container image automation service 320 can publish the built container images to a container image repository 340—which can later be accessed by containerized software environment 160 to deploy and run the software system in containerized software environment 160.

At step 4, CI/CD system 100 can deploy/launch the software system in containerized environment 160 using the built container images. As alluded to above, containerized software environment 160 can pull the built containerized images from container repository 340 and run them as part of this deployment process (see e.g., step 5 of FIG. 3).

The process of FIG. 3 can be implemented with various containerization platforms/orchestration tools (e.g., Kubernetes, Docker Swarm, Apache Mesos, etc.). Relatedly, various deployment technologies may be leveraged to deploy the software system in the virtualized software environment (e.g., Ansible®, Chef™, Salt™, etc.).

Before describing FIG. 4, it should again be understood that CI/CD system 100 provides an added advantage over many existing CI/CD systems that take container images as inputs. As alluded to above, relying on upstream container image generation can lead to inefficiencies (e.g., increased human labor, increased development costs, need for additional software tools/systems, etc.) in scenarios where a user (or team of users) wants to deploy a common software system in both a containerized and virtualized environment. For example, the extra upstream work required for generating container images does not advance/progress deployment in the virtualized environment. Relatedly, the upstream work required for generating the container images does not benefit from the automation advantages provided by the existing CI/CD systems. Accordingly, by facilitating (and in some cases performing) automated generation of container images, CI/CD system 100 can reduce inefficiencies associated with generating container images upstream from the CI/CD process—thereby further improving efficiency for containerized software deployment. Moreover (and as described above), by facilitating automatic deployment a software system in a virtualized environment and a containerized environment using a common set of inputs (i.e., a deployment descriptor and artifacts), CI/CD system 100 provides even further efficiency improvements by "filling two needs with one deed."

Here, CI/CD system 100 can automate container image generation because the artifacts and deployment descriptor of the present technology are intelligently configured/designed to contain the information required for such automation.

FIG. 4 illustrates an example computing component 400 that may be used to deploy a software system in a virtualized software environment, a containerized software environment, or both, in accordance with various examples of the present technology. In various examples, computing component 400 may be used to implement a CI/CD system of the present technology—such as CI/CD system 100.

Referring now to FIG. 4, computing component 400 may be, for example, a server computer, a controller, or any other similar computing component capable of processing data. In the example implementation of FIG. 4, the computing component 400 includes a hardware processor 402, and machine-readable storage medium for 404.

Hardware processor 402 may be one or more central processing units (CPUs), semiconductor-based microprocessors, and/or other hardware devices suitable for retrieval and execution of instructions stored in machine-readable storage medium 404. Hardware processor 402 may fetch, decode, and execute instructions, such as instructions 406-410, to control processes or operations for burst preloading for available bandwidth estimation. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 404 may be a non-transitory storage medium, where the term "non-transitory" does not encompass transitory propagating signals. As described in detail below, machine-readable storage medium 404 may be encoded with executable instructions, for example, instructions 406-410. Before describing instructions 406-410 in more detail, it should be understood that in various examples instructions 406-410 may be performed in various orders.

Hardware processor 402 may execute instruction 406 to receive a deployment descriptor describing an inventory of instantiated components to be deployed in a software system, relationships between the instantiated components within the software system, and configuration parameters for the instantiated components.

Hardware processor 402 may execute instruction 408 to receive artifacts describing components instantiated as the instantiated components.

In various examples, hardware processor 402 may also build and package the components being instantiated as the instantiated components. As alluded to above, building and packaging the components may be associated with a CI chain/stage that occurs prior to instantiation and deployment of components.

In various examples, the artifacts received at instruction 408 may be received before the deployment descriptor at instruction 406. In other words, hardware processor 402 may execute instruction 408 before instruction 406.

Hardware processor 402 may execute instruction 410 to: (a) in response to determining to deploy the software system in the virtualized environment, use the deployment descriptor and the artifacts to deploy the software system in the virtualized environment; and (b) in response to determining to deploy the software system in the containerized environment, using the deployment descriptor and the artifacts to deploy the software system in the containerized environment. In some examples, hardware processor 402 can make these determinations in response to user input—although this need not be the case in other examples, In some examples, deploying the software system in the virtualized environment may comprise: (i) using the deployment descriptor and the artifacts to determine virtual computing resources for deploying the software system in the virtualized environment; and (ii) in response to allocation of the determined virtual computing resources, computing and executing a virtualization workflow for deploying the software system in the virtualized environment using the allocated virtual computing resources. In certain examples, hardware processor 402 may request the determined virtual computing resources from a virtual computing resource manager.

In some examples, deploying the software system in the containerized environment may comprise: (i) using the deployment descriptor and the artifacts to compute containerization workflows for building container images for the software system; (ii) providing the containerization workflows to a container image automation service, wherein the container image automation service builds container images for the software system based on the containerization workflows; and (iii) deploying the software system in the containerized environment using the built container images. In other examples, deploying the software system in the containerized environment may comprise: (i) using the deployment descriptor and artifacts to compute containerization workflows for building container images for the software system; (ii) building container images for the software system based on the containerization workflows; and (iii) deploying the software system in the containerized environment using the built container images.

In various examples, hardware processor 402 and/or the container automation service may publish the built container images to a container image repository. In these examples, the containerized environment may pull the built container images from the container image repository to run the software system in the containerized environment.

In some examples, deploying the software system in the containerized environment may further comprise: (i) using the deployment descriptor and the artifacts to determine containerization configuration parameters for building the container images for the software system; and (ii) providing the determined containerization configuration parameters to the container image automation service, wherein the container image automation service builds the container images for the software system based on the containerization workflows and the determined containerization configuration parameters. In related examples, hardware processor 402 may use the containerization workflows and the determined containerization configuration parameters to build the container images.

In some examples, the containerization workflows and the virtualization workflow may be computed and executed using at least one of the following deployment technologies: (a) Ansible®; (b) Chef™; Salt™.

Figure 5:
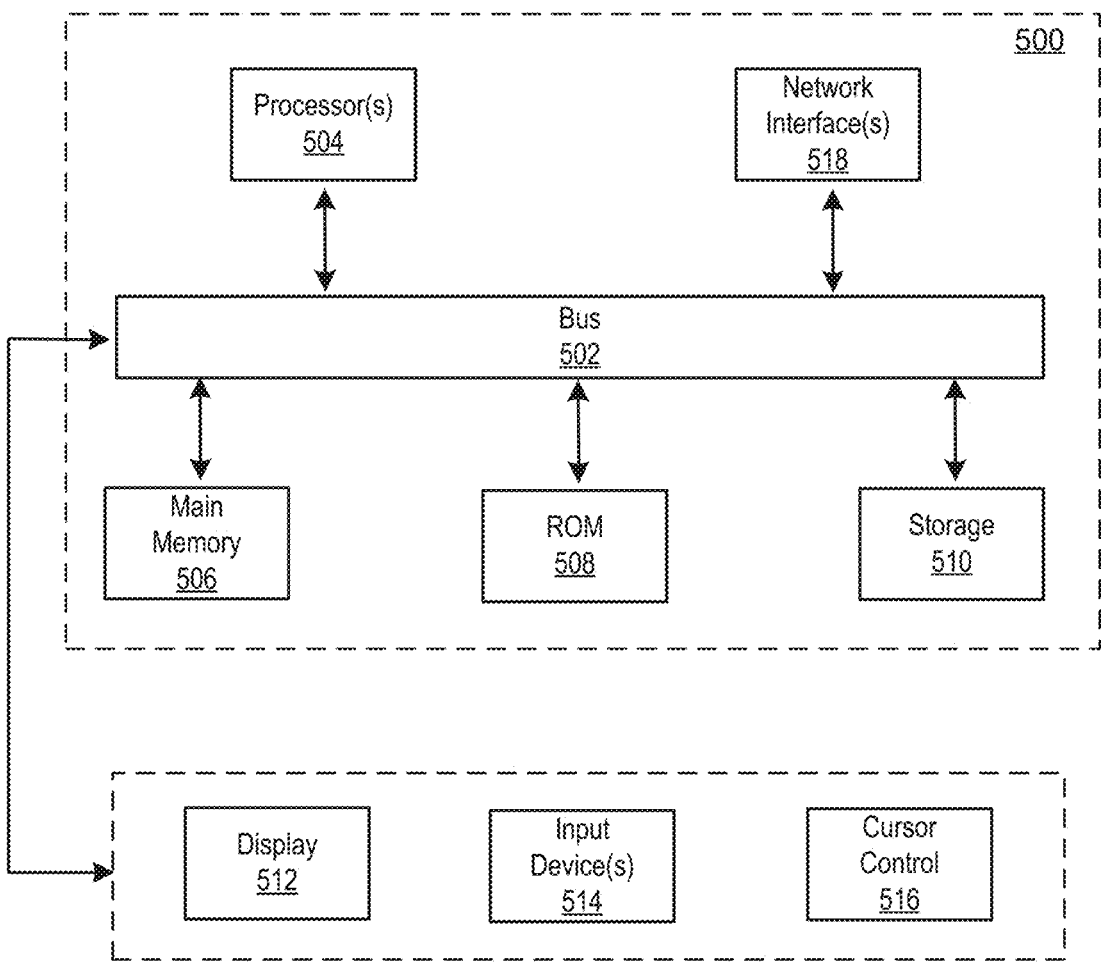
FIG. 5 is an example computer system that may be used to implement various features of the present disclosure.

FIG. 5 depicts a block diagram of an example computer system 500 in which various of the examples described herein may be implemented. For example, computing system 500 may be used to implement a CI/CD system of the present technology—such as CI/CD system 100. Relatedly, computing system 500 may be used to implement computing component 400 of FIG. 4

The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some examples, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," "data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one example, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a Compact Disc Read-Only Memory (CD-ROM), any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or wide area network (WAN) component to communicate with a WAN). Wireless links may also be implemented. In any such implementation, communication interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, Programmable Logic Arrays (PLAs), Programmable Array Logic (PALs), Complex Programmable Logic Device (CPLDs), FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

What is claimed is:

1. A method, comprising:

receiving a deployment descriptor describing an inventory of components to be instantiated and deployed in a software system, relationships between the components within the software system, and configuration parameters for the components;

receiving artifacts describing the components being instantiated as instantiated components;

in response to determining to deploy the software system in a virtualized environment, using the deployment descriptor and the artifacts to deploy the software system in the virtualized environment; and in response to determining to deploy the software system in a containerized environment, deploying the software system in the containerized environment by:

using the deployment descriptor and the artifacts to compute a containerization workflow for building a container image for the software system, wherein the containerization workflow comprises a set of instructions for instantiating the components and deploying the instantiated components, providing the containerization workflow to a container image automation service, wherein the container image automation service builds the container image for the software system from the containerization workflow, and deploying the software system in the containerized environment using the built container image.

2. The method of claim 1, further comprising:
building and packaging the components being instantiated as the instantiated components.

3. The method of claim 1, wherein deploying the software system in the virtualized environment comprises:

using the deployment descriptor and the artifacts to determine virtual computing resources for deploying the software system in the virtualized environment; and in response to allocation of the determined virtual computing resources, computing and executing a virtualization workflow for deploying the software system in the virtualized environment using the allocated virtual computing resources.

4. The method of claim 3, further comprising:
requesting the determined virtual computing resources from a virtual computing resource manager.

5. The method of claim 1, wherein deploying the software system in the containerized environment further comprises:

using the deployment descriptor and the artifacts to determine containerization configuration parameters for building the container images for the software system; and providing the determined containerization configuration parameters to the container image automation service, wherein the container image automation service builds the container images for the software system based on the containerization workflows and the determined containerization configuration parameters.

6. The method of claim 1, wherein:
the container image automation service publishes the built container images to a container image repository; and the containerized environment pulls the built container images from the container image repository to run the software system in the containerized environment.

7. The method of claim 1, wherein the deployment descriptor comprises at least one of:

a settings file that defines the configuration parameters for each component; and a layout file that defines instantiation of components and describes how the components connect to each other.

8. A Continuous Integration/Continuous Deployment (CI/CD) system, comprising:

a memory comprising computer code; and one or more processors operatively connected to the memory and configured to execute the computer code to:

receive a deployment descriptor describing an inventory of components to be deployed in a software system, relationships between the components within the software system, and configuration parameters for the components;

receive artifacts describing the components being instantiated as instantiated components;

in response to determining to deploy the software system in a virtualized environment, use the deployment descriptor and the artifacts to deploy the software system in the virtualized environment; and in response to determining to deploy the software system in a containerized environment, deploying the software system in the containerized environment by:

using the deployment descriptor and the artifacts to compute containerization workflows for building container images for the software system, wherein the containerization workflows comprise a set of instructions for instantiating the components and deploying the instantiated components, building container images for the software system from the containerization workflows, and deploying the software system in the containerized environment using the built container images.

9. The CI/CD system of claim 8, further comprising computer code that causes the system to:

build and package the components being instantiated as the instantiated components.

10. The CI/CD system of claim 8, further comprising computer code that causes the system to:

publish the built container images to a container repository, wherein the containerized environment pulls the built container images from the container repository to run the software system in the containerized environment.

11. The CI/CD system of claim 10, wherein a container image automation service of the CI/CD system builds the container images and publishes the built container images to the container repository.

12. The CI/CD system of claim 8, wherein deploying the software system in the virtualized environment comprises:

using the deployment descriptor and the artifacts to determine virtual computing resources for deploying the software system in the virtualized environment; and in response to allocation of the determined virtual computing resources, computing and executing a virtualization workflow for deploying the software system in the virtualized environment using the allocated virtual computing resources.

13. The CI/CD system of claim 12, wherein the deployment descriptor comprises at least one of:

a settings file that defines the configuration parameters for each instantiated component; and a layout file that defines instantiation of the components and describes how the components connect to each other.

14. The CI/CD system of claim 8, wherein deploying the software system in the containerized environment further comprises:

using the deployment descriptor and the artifacts to determine containerization configuration parameters for building the container images for the software system; and building the container images for the software system based on the containerization workflows and the determined containerization configuration parameters.

15. A non-transitory computer-readable storage medium including instructions that, when executed by at least one processor of a computing system, cause the computing system to:

receive a deployment descriptor describing an inventory of components to be deployed in a software system, relationships between the components within the software system, and configuration parameters for the components;

determining to deploy the software system in one of a containerized environment or in a virtualized environment;

in response to determining to deploy the software system in the containerized environment, using the deployment descriptor to deploy the software system in the containerized environment by computing a containerization workflow for building a container image for the software system based on the deployment descriptor; and in response to determining to deploy the software system in the virtualized environment, deploying the software system in the virtualized environment by:

using the deployment descriptor to determine virtual computing resources for deploying the software system in the virtualized environment; and in response to allocation of the determined virtual computing resources, computing and executing a virtualization workflow for deploying the software system in the virtualized environment using the allocated virtual computing resources.

16. The non-transitory computer-readable storage medium of claim 15, wherein deploying the software system in the containerized environment comprises:

using the deployment descriptor to compute a containerization workflow for building a container image for the software system, wherein the containerization workflow comprises a set of instructions for instantiating the components and deploying the instantiated components;

providing the containerization workflow to a container image automation service, wherein the container image automation service builds the container image for the software system from the containerization workflow; and deploying the software system in the containerized environment using the built container image.

17. The non-transitory computer-readable storage medium of claim 16, wherein the deployment descriptor comprises at least one of:

a settings file that defines the configuration parameters for each instantiated component; and a layout file that defines instantiation of the components and describes how the components connect to each other.

18. The non-transitory computer-readable storage medium of claim 15, wherein the instructions further cause the computing system to:

receive artifacts describing the components being instantiated as the instantiated components;

in response to determining to deploy the software system in the containerized environment, use the artifacts and the deployment descriptor to deploy the software system in the containerized environment; and in response to determining to deploy the software system in the virtualized environment, deploying the software system in the virtualized environment by:

using the artifacts and the deployment descriptor to determine the virtual computing resources for deploying the software system in the virtualized environment.

19. The non-transitory computer-readable storage medium of claim 16, wherein:

the container image automation service publishes the built container image to a container repository; and the containerized environment pulls the built container image from the container repository to run the software system in the containerized environment.

20. The non-transitory computer-readable storage medium of claim 15, wherein the instructions further cause the system to:

build and package the components being instantiated as the instantiated components.

* * * * *